United States Patent

Dickson et al.

Patent Number: 5,851,932
Date of Patent: Dec. 22, 1998

[54] BALLISTIC ARMOR LAMINATE

[75] Inventors: Lawrence J. Dickson, Granville; Donald L. Blake, Newark, both of Ohio

[73] Assignee: Isorco, Inc.

[21] Appl. No.: 958,127

[22] Filed: Oct. 6, 1997

[51] Int. Cl.⁶ .................................... B32B 5/26
[52] U.S. Cl. .................. 442/135; 442/134; 428/213; 428/911
[58] Field of Search .................. 442/135, 134; 428/911, 213

[56] References Cited

U.S. PATENT DOCUMENTS

| | | |
|---|---|---|
| 4,079,161 | 3/1978 | Kile . |
| 4,213,127 | 7/1980 | Cole . |
| 4,309,487 | 1/1982 | Holmes . |
| 4,428,998 | 1/1984 | Hawkinson . |
| 4,550,044 | 10/1985 | Rosenberg . |
| 4,623,574 | 11/1986 | Harpell et al. ............... 442/135 X |
| 4,916,000 | 4/1990 | Li et al. ............... 442/135 X |
| 5,132,167 | 7/1992 | Prato . |
| 5,175,040 | 12/1992 | Harpell et al. . |
| 5,190,802 | 3/1993 | Pilato . |
| 5,215,813 | 6/1993 | Hartman et al. ............... 442/135 |
| 5,330,820 | 7/1994 | Li et al. . |
| 5,660,913 | 8/1997 | Coppage, Jr. ............... 428/911 X |
| 5,736,474 | 4/1998 | Thomas ............... 428/911 X |

*Primary Examiner*—Daniel Zirker
*Attorney, Agent, or Firm*—Charles F. Schroeder

[57] ABSTRACT

A ballistic composite laminate exemplified by a panel incorporating resin impregnated, heat and pressure bonded, fabric layers of high tensile strength "S" glass roving filaments on its backside extending through approximately one-half its thickness with the remainder of its thickness on the face side of the laminate formed of appreciably lower cost fabric layers of "E" glass filaments, which meet acceptance according to military ballistic acceptance tests substantially matching higher cost panels reinforced with fabrics of 100% "S" glass filaments.

15 Claims, 1 Drawing Sheet

BALLISTIC ARMOR LAMINATE

FIELD OF THE INVENTION

This invention relates to laminated ballistic panels or articles incorporating resin impregnated fabric layers of high tensile strength filaments bonded together under heat and pressure, and more particularly to resin impregnated fabric layers of high tensile strength filaments combined with fabric layers of lower cost lower tensile strength filaments, but generally with the same impact strength against projectile penetration as the fabrics of high tensile strength filaments.

BACKGROUND

A successful ballistics armor composite commercially available incorporates resin impregnated sheets of 100% high tensile strength glass filaments in the form of woven roving. High tensile strength filaments of such type are commercially available as "S2" glass filaments marketed by Owens Corning Corporation of Toledo, Ohio and generally known as "S" glass filaments. "S" glass is chemically a three component high strength glass which in filament form have a tensile strength of about 700,000 psi. Although ballistic armor laminates made of such glass in filament form as roving bundles woven into fabrics incorporated in ballistic panels are quite successful in resisting projectile penetration, such panels of 100% "S" glass filaments are quite costly.

SUMMARY OF THE INVENTION

According to the present invention it has been found that practically the same ballistic results can be obtained with a ballistic article having about one-half its thickness made up of layers of "E" glass filaments on the face side of the panel with the remainder of the thickness made up of the higher tensile strength "S" glass filaments. "S" glass filaments, as pointed out above, have a tensile strength of about 700,000 psi, while "E" glass filaments have a lower tensile strength of about 500,000 psi.

Beside a 35–45% higher tensile strength, S glass filaments compared to E glass filament reinforcements have a 20–40% higher flexural strength, a 20–25% higher compressive strength and an 18–20% higher Youngs Modulus, as well as a 2–4% lower density.

Compositions of "E" and "S" glass filaments respectively are as follows:

| Composition (Wt %) | E-glass | S-glass |
|---|---|---|
| $SiO_2$ | 54.2 | 65 |
| $Al_2O_3$ | 14.4 | 25 |
| $B_2O_3$ | 8.0 | |
| $MgO$ | 4.7 | 10 |
| $CaO$ | 17.3 | |
| $Na_2O$ | 0.2 | |
| $K_2O$ | 0.2 | |
| $Fe_2O_3$ | 0.8 | |
| $F_2$ | 0.1 | |

Tests conducted according to military acceptance standards unexpectedly give favorable results in tests of laminates ½" thick in which the face half is reinforced with woven E glass filaments backed by ¼" thickness of woven S glass filaments. Acceptance results are obtained in resisting projectiles matching those of tests of panels reinforced by 100% "S" glass filament layers.

Such favorable acceptance results are of considerable advantage cost-wise since "E" glass filaments have a cost about ⅕th per pound as that of filaments of "S" glass. Thus with a 50—50 ratio of "S" glass filaments layers and "E" glass filaments layers, the cost of a composite laminate is about 40% less than the cost of a panel reinforced by 100% "S" glass filaments. In this regard, cost reduction is an important aspect of the present invention because of the otherwise traditional high cost of ballistic products used for life saving protection such as in military defense, or for police protection. All such product costs entail considerable expenditure of public tax funds in the protection of human life.

Although described herein in relation to basic panel constructions and tests conducted thereon, it will be understood by those skilled in the art that the laminate of the invention is adaptable to manufacture of a wide range of ballistic articles and devices. Typical applications for composite armor of this invention include riot shields, clipboards, helmets, and other personnel protective devices, as well as armor for naval ships, automobiles, military vehicles, tactical shelters, and transportable containers.

An important object of the invention is to provide a ballistic resistant panel equal to or more effective than conventional commercially available panels, but at a much lower cost.

Other objects and structural features which are believed to be characteristic of our invention are set forth with particularly in the appended claims. Our invention, however, both in organization and manner of construction, together with further objects and features thereof, may be best understood by reference to the following description taken in connection with the accompanying drawings.

DETAILED DESCRIPTION

Glass fiber fabrics perform excellently ballistically when combined with various resin systems to form composite or reinforced plastic armor. The bonded layers of reinforcing fabric permit load transfer to non-primary yarns through the continuum of the matrix, allowing wave propagation in the thickness direction and spreading the load over a larger area on the back layers. Polyester, phenolic, and vinyl ester resins it is found perform better than epoxies. Flexible resin matrices can also be used to make a more easily deformed laminate with good performance. The primary function of front plies in a composite is to spread the impact over a large area. The front face spreads the load, breaks up and slows the projectile.

Figure 1:
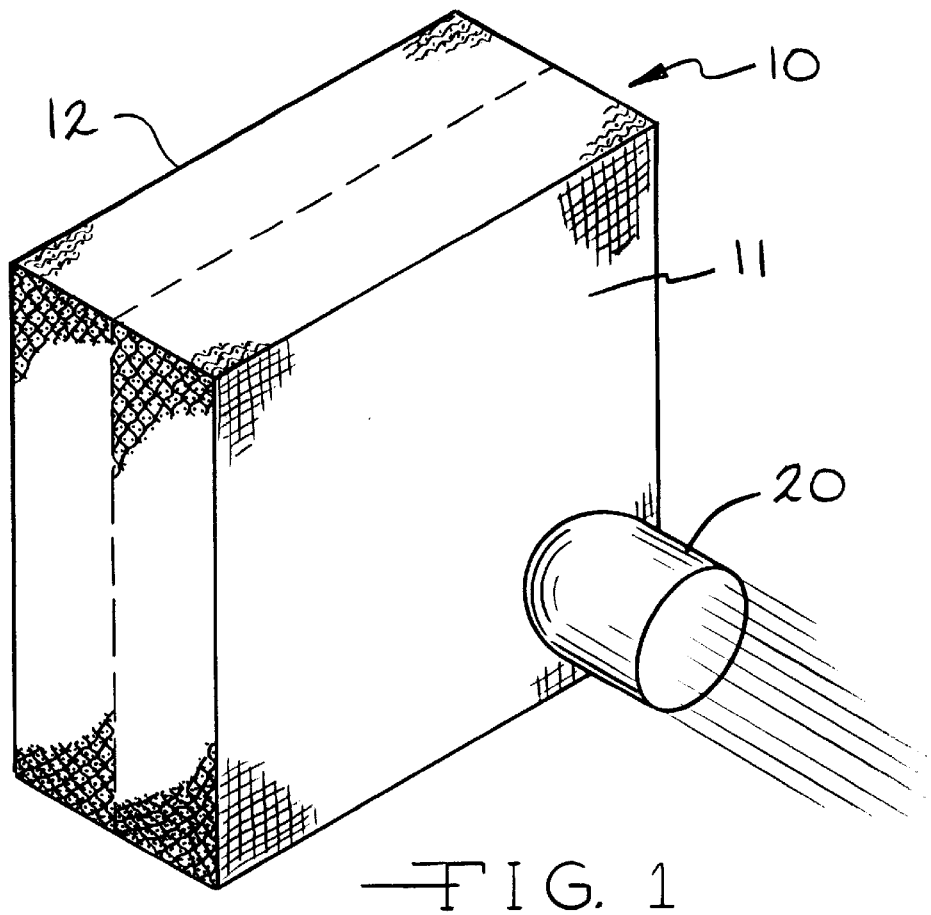
FIG. 1 is a schematic perspective representation of a section of armor panel of the present invention illustrating front and back layers of the laminate of two different types of filament materials with a projectile illustrated as advancing to the face of the panel.

FIG. 1 illustrates a ballistic panel 10 having a front face portion 11 made up of woven strands of roving, for example of "E" glass filaments. A back face portion 12 is made up of layers of woven strands of high tensile strength filaments, for example "S" glass filaments. The panel 10 is a resin laminate, usually incorporating a polyester, a phenolic or a vinyl ester resin, made by compressing a stack of phenolic prepregs of woven glass strands of roving, for example approximately 25 prepreg layers. The stack of prepregs can be integrated under a pressure of 50 to 100 psi at a temperature in the order of 340 Degrees F. for approximately one hour. Rather than the use of prepregs, woven fabric layers can be wet out with resin prior to stacking and compression.

The fabric layers are woven of roving strands which strands are untwisted, unplied gatherings of filaments drawn in parallel orientation. The number of filaments per strand vary from 204 to over 2,000. The accumulation of strands may be drawn from a creel of forming packages of strand such as 20 ends of strands of "G" fibers yielding about 750,000 yards per pound, or 60 ends of "K" fiber yielding 125 yards per pound. "G" fiber diameters fall in the range of 35 to 40/100,000 inch while "K" filaments have a diameter ranging from 50 to 55/100,000 inch. Filaments coarser than "K" diameter are subject to excessive filament breakage in weaving operations.

The ballistic panel 10 is illustrated with fabric layers of "E" glass and "S" glass filaments, each amounting to about 50% of the thickness of the panel. Successful acceptance results have been obtained with such a panel in halting the penetration of projectiles through the panels compared to conventional panels of 100% woven roving fabric of "S" glass filaments having substantially the same thickness. As indicated above, "E" glass filaments have a tensile strength about ⅔rds that of "S" glass filaments. The Youngs Modulus of elasticity for E glass filaments is 10–10.5 Msi whereas the Youngs Modulus for S glass filaments is 12.5–13 Msi. Tests indicate, however, that in firing projectiles through such ballistic panels, the first or face portion of the panels absorb the energy of the projectiles in compression before the high tensile strength of the woven filaments take over and resist the penetration.

In its simplest form, as reported in prior art literature, the impact of a projectile on a single filament or yarn elicits a longitudinal wave propagation outward from, or perpendicular to the path of the projectile, at the speed of sound. The higher the wave velocity, the greater the volume of fiber capable of interacting with the projectile. A second, or transverse wave, propagates along the fiber, behind which material begins to move transverse to the fiber axis parallel to and at the speed of the projectile. The lateral displacement behind the transverse wave front leads to loading of secondary yarns through cross-over interactions, thereby unloading the primary yarns. Experimental evidence shows that up to 40–50% of the total energy is absorbed by the secondary yarns. The front face spreads the load, breaks up, and slows the projectile.

Figure 2:
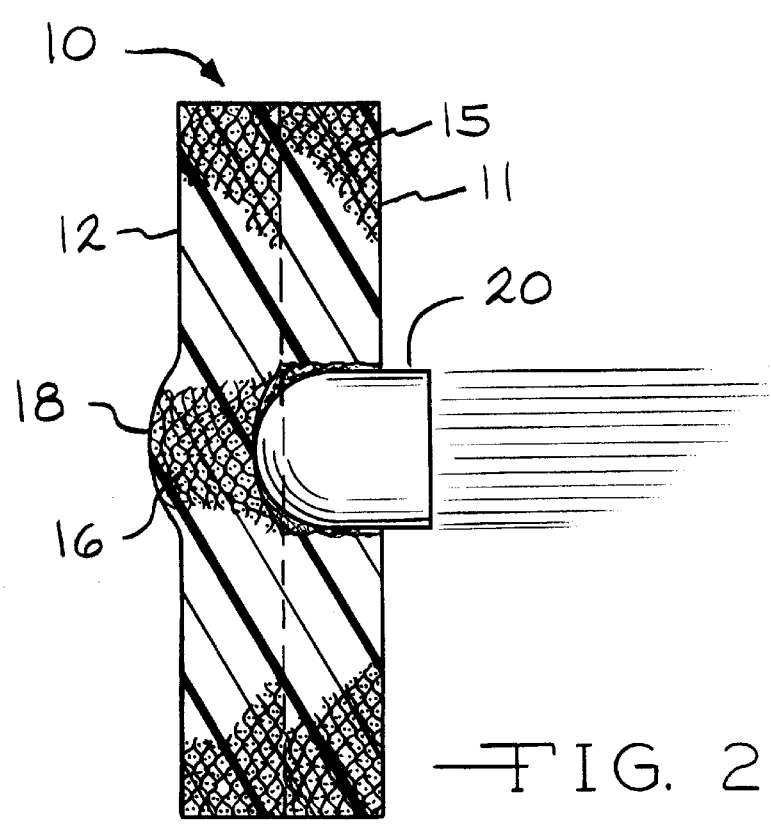
FIG. 2 is a schematic cross-sectional side elevation illustration of the ballistic panel of FIG. 1 showing the projectile or bullet of FIG. 1 having passed through the first layers of lower tensile strength filaments and impacting the backside of high tensile strength of filament layers.

FIG. 2 illustrates more clearly how the projectiles will penetrate the front face 11 from an opening 15 in the "E" glass layers which absorb the impact energy in compression and slows the projectile before it reaches the "S" glass fabric layers where the energy to halt a bullet from passing through the panel is absorbed by the tensile strength of the "S" glass fabric, resulting in a bulge 18 in the back side of the panel.

The V50 military test specification is based on acceptance of a ballistic barrier only if it meets or exceeds a projectile velocity of 2400 feet per second. If in half the tests the projectiles pass completely through a ballistic panel and half pass only partially through at a given velocity above 2400, the panel is considered acceptable. That is, the barrier velocity of a panel is the velocity at which a projectile is stopped in half the tests and passes through the panel in the remaining half of tests. The higher the V50 velocity number, the more acceptable the panel is as a ballistic product. In other words, according to military specifications, a ballistic panel is acceptable only if the mean of tests so conducted is at a V50 velocity above 2400 feet per second.

In tests conducted on control panels ½ inch thick reinforced with 100% S glass filaments, the V50 barrier velocity extended from 2615 to 2646. Panels reinforced by 100% E glass filaments did not pass the requirements in that they resulted in a V50 velocity extending from 1917 to 1934, below the acceptance velocity of 2400. However, panels having one-half their thickness reinforced by E glass filaments in their face and the remainder by S glass filaments resulted in acceptance with a V50 barrier velocity between 2415 and 2512. Thus, acceptable ballistic armor panels reinforced only partially by S glass filaments in the backside of their thickness and E glass filaments in their face provide passing results at a significantly lower cost than 100% S glass reinforced panels.

The panel 10 as herein illustrated is reinforced with about 50% of its front thickness of "E" glass filament layers and 50% of "S" glass filament layers in its back side. The panel, however, can be designed with different proportions of such layers dependent upon the projectile to be resisted. In this regard, the panel can be made with 40 to 60% of its thickness reinforced with "E" glass filament layers and the remainder of its thickness with "S" glass filament layers, dependent upon the projectile to be resisted or halted by the panel.

The thickness of the panel 10 can be made of woven fabrics but under certain conditions unwoven fabrics incorporating a resin for bonding and to provide a matrix can be produced as described by stacking the layers and heating them under compression to integrate the stack into the ballistic panel desired. Composite armors made with resin binders and woven roving do not show a strong dependence on weave construction. The effect of weave is probably masked by the resin-fiber bonding which distributes the impact energy more efficiently.

Resins such as polyesters, phenolics and vinyl esters, have been found to perform better than more brittle resins like an epoxy. Resins showing increased ductility will absorb more energy both in crack initiation and propagation. Evidence suggests that, for the best ballistic efficiency, the resin content is preferred to be 20–25% by weight. Laminates with less resin content show increased ballistic protection, but the deformations are severe and unacceptable for most applications. Some applications require the laminate to serve as a structural component as well as to give ballistic protection. The best mechanical properties occur at much higher resin content, so a compromise must be reached between mechanical and ballistic performance. In the present instance, the glass content of the ballistic composites of the invention is found to be preferably about 80% by weight.

The bonded layers of reinforcing fabric permit load transfer to non-primary yarns through the continuum of the matrix, allowing force wave wove propagation in the thickness direction and spreading the load over a larger area on the back layers. The primary function of the front plys in a composite is to spread the impact over a large area. That is the front face spreads the load, breaks up and slows the projectile.

It appears that because of the greater yield of the E glass filaments compared to the S glass filaments evidenced by their lower modulus of elasticity upon impact by a projectile, the E glass filaments yield more and transfer the impact forces to underlying layers of filaments and thereby distribute the impact force more than S glass filaments having a lower yield property. Thus the E glass filaments give and distribute the impact force prior to the projectile contacting the layers of S glass filaments on the backside of the panel of the invention.

In other words, prior to breaking, the E glass filaments distribute the force and resist the projectile prior to breakage, and in a sense provide a bulk resistance to the projectile prior to the sharp resistance offered by the higher modulus of elasticity of S glass filaments on the backside of the panel. Thus, in effect the layers on the front side of the panel and at the back side work in cooperation with each other in distributing and resisting the forces of impact practically as well as if the entire thickness of the composite were of S glass filaments.

The panel structure of the present invention is most clearly described herein in relation to providing an armor composite panel having one-half its thickness reinforced by fabrics of "E" glass filaments on the front side and fabrics of S glass filaments on the back side. The invention however contemplates more generally a V50 receptacle laminate reinforced by filaments S glass and filaments having a lower Youngs Modulus than S glass on its front side, like E glass filaments or other high tensile filaments, having a thickness found by trial and error of from one to two-thirds of the thickness of the panel dependent upon the character of the projectile and the velocity of projectiles to be resisted.

Other synthetic filaments beside S glass filaments might be incorporated in ballistic panels of the type described herein such as filaments of carbon or of Kevlar produced by DuPont Corporation, or Spectra Shield layers, produced by Allied Signal Corporation, each of which might be a substitute for "S" glass filaments, but at a much higher cost and with need for considerable increase in thickness of the composite because of their differences in weight and corresponding difference in resistance to penetration. Such that such product variations would result in much more costly ballistic panels and objectionable differences in construction from that of the present invention.

In view of the foregoing it will be understood that many variations of the arrangement of our invention can be provided within the broad scope of principles embodied therein. Thus while particular preferred embodiments of our invention have been shown and described, it is intended by the appended claims to cover all such modifications which fall within the true spirit and scope of the invention.

We claim:

1. A ballistic impact resistant laminate structure comprising stacked layers of glass filament fabrics, said layers of glass fabrics each having been impregnated with heat curable resin bonding material, said stacked layers of impregnated fabrics having been integrated under heat and pressure to produce said structure, a portion of the thickness of said structure comprising fabrics of "E" glass roving filaments to provide a front face for said structure, and the remainder backside portion of the thickness of said structure comprising fabrics of "S" glass roving filaments.

2. A ballistic resistant structure as set forth in claim 1 wherein said heat curable resin bonding material comprises 15–25% by weight of said layers of glass fabrics.

3. A ballistic resistant structure as set forth in claim 1 wherein said face fabrics of "E" glass filaments comprise 40% to 60% the thickness of said panel.

4. A ballistic resistant structure as set forth in claim 3 wherein said face fabrics of E glass filaments comprise ½ the thickness of said structure.

5. A ballistic structure as set forth in claim 1 wherein said fabric layers are each a woven roving fabric layer.

6. A ballistic resistant structure as set forth in claim 1 wherein said resin bonding material is selected from the group consisting of polyesters, phenolics and vinyl esters.

7. A ballistic resistant structure as set forth in claim 2 wherein said resin bonding material comprises 20% by weight of said fabrics.

8. A ballistic impact resistant composite structure as set forth in claim 2 having a thickness of ½ inch comprising approximately 20 layers of fabrics.

9. A ballistic impact resistant composite structure as set forth in claim 4 in which said impregnated fabrics are each a prepreg layer.

10. A ballistic impact resistant laminate structure as set forth in claim 4 in which said fabric layers are each wet out with said resin bonding material before being stacked.

11. A ballistic impact resistant composite structure as set forth in claim 2 in which said stacked layers of impregnated fabrics are integrated under a pressure of 50 to 100 psi at a temperature of approximately 340° F.

12. A ballistic impact resistant structure, comprising a laminate formed of fabrics of glass reinforcement filaments impregnated with heat curable resin binder material integrated under heat and pressure, 40% to 60% of the thickness of said laminate including S glass filament fabrics on its backside, the remainder of the thickness of said laminate comprising E glass filament fabrics on its face side.

13. A ballistic structure as set forth in claim 12 in which approximately one-half the thickness of said laminate comprises S glass filament fabrics.

14. A ballistic structure as set forth in claim 12 in which said resin binder material comprises approximately 20% of the material in said section.

15. A ballistic structure as set forth in claim 12 in which said fabrics are woven roving fabrics.

* * * * *